United States Patent

Rundell et al.

[15] 3,635,200
[45] Jan. 18, 1972

[54] HYDROCARBON CONVERSION PROCESS AND APPARATUS

[72] Inventors: Clark Ace Rundell, Wheaton; Heyman Clarke Duecker, Ellicott City; Carl Vance McDaniel, Laurel, all of Md.

[73] Assignee: W. R. Grace & Co., New York, N.Y.

[22] Filed: Feb. 18, 1970

[21] Appl. No.: 12,386

[52] U.S. Cl. ........................... 123/3, 123/119 E, 123/122 E
[51] Int. Cl. ........................................................ F02b 43/08
[58] Field of Search ..................... 123/119 R, 119 E, 3, 122 E

[56] References Cited

UNITED STATES PATENTS 1,833,552  11/1931   Balachowsky et al. ............. 123/119 E
1,902,630  3/1933   Fairchild ............................. 123/119 E
2,206,685  7/1940   Balchowsky ....................... 123/119 E

FOREIGN PATENTS OR APPLICATIONS

659,684   2/1929   France ............................... 123/119 E

*Primary Examiner*—Wendell E. Burns
*Attorney*—Joseph P. Nigon and Kenneth E. Prince

[57] ABSTRACT

A system comprising the use of a small mobile catalytic cracking unit in conjunction with a mobile internal combustion engine. The cracking unit is used to treat the fuel for use in the engine.

9 Claims, 7 Drawing Figures

INVENTORS
C. A. RUNDELL
H. C. DUECKER
C. V. MCDANIEL
BY
ATTORNEY

INVENTORS
C. A. RUNDELL
H. C. DUECKER
C. V. MCDANIEL
BY Joseph P. Nixon
ATTORNEY

FIG. 7

INVENTORS
C. A. RUNDELL
H. C. DUECKER
C. V. MCDANIEL
BY
ATTORNEY

HYDROCARBON CONVERSION PROCESS AND APPARATUS

The fuel requirements for mobile internal combustion engines are subject to many requirements because of the diverse conditions under which these engines are required to operate. Among these requirements are octane value, volatility, fuel value, burning characteristics, and fuel transportation and storage safety. Internal combustion engines in general, and especially in automobiles, operate on leaded-gasoline fuels. Until now, this fuel has offered the best compromise available. It is now apparent that leaded gasoline has definite deficiencies that will make it unsuitable in the future. These shortcomings are centered in the pollution caused by internal combustion engines fueled by leaded gasoline. Other disadvantages of leaded gasoline for fuels are engine wear, marginal volatility at low temperatures, etc.

Many of the disadvantages of leaded gasoline fuels are overcome by the use of unleaded lower molecular weight hydrocarbon fuels such as methane, ethane, propane, butane, etc. These fuels in general have higher octane values, higher volatility, good burning characteristics, etc. The major disadvantage of these fuels, which has prevented their widespread application to a mobile internal combustion engine until now, lies in the fact that these fuels are difficult to store and transport and, in addition, their storage and transportation create an extreme safety hazard.

Our novel invention obtains the advantage of low molecular weight hydrocarbon fuels while at the same time eliminating the hazards involved with their storage and transportation.

In summary, our novel invention works in the following manner. An unleaded fuel having relatively low volatility, such as gasoline, is stored in the vehicle in a conventional manner. Simultaneously, as the engine requires fuel, the required amount of liquid fuel is converted by our catalytic converter system to highly volatile lower molecular weight hydrocarbons which are immediately consumed by the engine.

In general, the octane number of the hydrocarbon fuel decreases as the molecular weight increases. Examples are shown in table I below:

TABLE I

Octane Numbers of Various Hydrocarbons

| Hydrocarbon | Research Octane |
|---|---|
| Methane | 120 |
| Ethane | 118 |
| Propane | 112 |
| n-butane | 93.6 |
| n-pentane | 61.9 |
| n-hexane | 24.8 |
| n-heptane | 0 |

Most commercial gasolines lead compounds in order to increase the octane number. The use of low molecular weight hydrocarbons as additives to increase the octane number of the fuel is not feasible because of their high volatility. Serious air pollution problems created by the use, as fuels, of gasoline containing lead compounds are:

a. Dangerous lead-containing compounds are emitted in the exhaust, and b. Catalytic systems designed to reduce the exhaust emissions of unburned hydrocarbons and nitrogen oxides are rendered ineffective after contamination by lead compounds.

Our system eliminates the need for lead compounds in fuels by the conversion of low-octane, higher molecular weight fuels (unleaded gasoline, for example) to higher octane, lower molecular weight fuel. This gives obvious advantages in the area of vehicular emissions control.

The advantages to be gained by the use of more volatile fuels are well known. One of these advantages is in the ease of carburetion. Complex carburetor designs have been required for the proper operation of modern engines with gasoline. This problem is aggravated by high rates of fuel consumption and the resulting evaporative cooling that occurs in the carburetor. This often leads to the undesirable condition known as "carburetor icing." Another advantage of more volatile fuels is in starting the engine especially at low temperatures such as are often encountered in winter. In order to reduce this problem, gasoline manufacturers often add unusually high amounts of the more volatile hydrocarbons such as pentane in colder climates and especially during the winter season. Although this makes the engine easier to start at low temperatures, it increases the evaporative loss on warmer days and contributes to the undesirable vaporization of fuel in fuel lines in warm areas of the vehicle. This results in the undesirable condition known as vapor lock.

Out novel invention attains the advantages of highly volatile fuels without the disadvantages arising from the transportation and storage of these materials.

The storage and transportation of a fuel of relatively low volatility results in less fuel lost by evaporation from storage tanks, gas tanks, carburetors, etc. The vapors lost in this manner make a major contribution to the pollution of the atmosphere by vehicles. As mentioned earlier, the less volatile fuels also reduce the problem of undesirable evaporation such as encountered in the condition known as vapor lock.

The use of butane fuel, for example, results in greatly reduced amounts of carbon deposited within the engine. These particles of carbon deposit on engine parts and contaminate the lubricating oil. These carbon deposits and contaminated oil are the major causes of engine wear. Also unburned portions of the liquid fuels, such as gasoline, tend to dilute the lubricating oil, decreasing its ability to properly lubricate the engine.

The system of our invention provides a safe and convenient method of providing gaseous hydrocarbon fuel. The fuel is stored as a liquid in the fuel tank of the vehicle under proven conditions for safe and efficient storage. As the fuel is used, it is moved from the fuel tank into the catalytic converter where a substantial portion of it is converted to lower boiling hydrocarbons which are fed to the engine within a few seconds after being converted. There is thus no necessity for transporting large quantities of these gaseous hydrocarbons in pressurized tanks that would create safety problems.

In our novel system we define the term "improved performance" to include the following advantages:

1. The system will produce low-boiling hydrocarbons having higher octane numbers, hence the use of tetraethyl lead as an antiknock component of the fuel can be eliminated.

2. Our novel system provides low-boiling hydrocarbons without the need for the transportation of large quantities of these low-boiling and gaseous hydrocarbons in pressurized tanks. 3. Engine wear is reduced since the fuel fed to the engine is a mixture of low-boiling hydrocarbons.

4. Since our system produces a fuel in vapor form, cold weather starting is facilitated.

5. Our novel system can be easily integrated into methods of present operation, particularly, in the automotive field. The gasoline currently used in automobiles can be used in our novel system. The gasoline distribution system would essentially remain the same as at present.

6. The system improves fuel economy and engine performance under load and reduces the fuel cost in internal combustion engines.

7. The carburetor and air cleaner system can be redesigned to a simpler system.

8. Our system gives a higher probability of meeting future state and federal specification on vehicular pollution emission.

In our process, a liquid fuel, such as gasoline, is passed over a hydrocarbon conversion catalyst where a significant portion is converted to lower molecular weight hydrocarbons (having one to four carbon atoms in the molecule) that are fed directly into an internal combustion engine. The catalyst is regenerated to remove carbon by passing small amounts of air over the catalyst.

The features of importance in our process and apparatus are apparent in the following description of the drawings.

FIGS. 2–3 show methods of heating the catalytic reactor by electrical resistance.

FIG. 4 shows the position of the catalytic reactor when the heat is applied from the exhaust manifold.

FIG. 5 shows the heating of the reactor through the addition of an oxidation catalyst to the catalyst bed.

Figure 1:
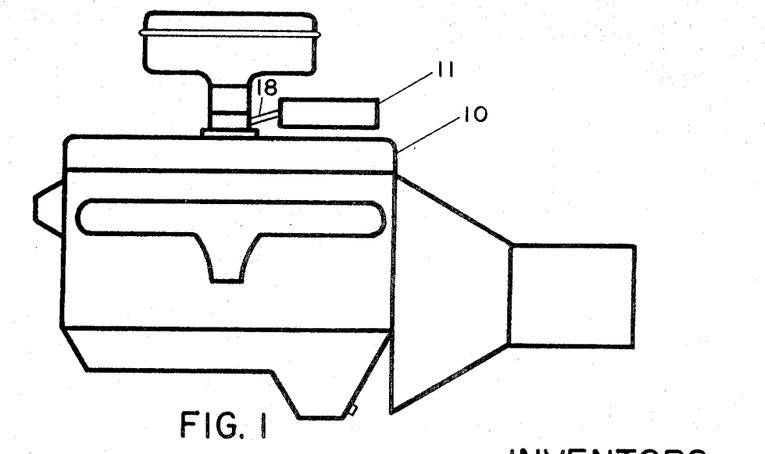
FIG. 1 is a typical reactor system showing the structural details of the catalytic reactor.

In accordance with the drawings, there is shown in FIG. 1 an internal combustion engine 10 with catalytic converter 11 positioned to feed the converted hydrocarbons into the carburetor of the internal combustion engine. The details of the reactor 11 are shown in the figure.

In this system, valve 12 connected with the accelerator admits liquid fuel through the inlet 20 through the valve 13 into the catalytic converter sections 19 and 23. The effluent from the converter is passed through valves 16 and 17 into the line 18 which is connected directly into the carburetor. The reactor is equipped with air intake orifices 14 and 15.

In operation, the valve 13 directs the gasoline stream to one of the catalytic conversion sections 19 or 23 of the reactor. During the period when the gasoline is being passed through the reactor 19 for example, air is being passed through the reactor 23 through the orifice 14 to regenerate the catalyst bed 23. After a suitable period of time, valve 13 passes the gasoline through the bed 23 while the bed 19 is being regenerated by the passage of the air through the air intake orifice 15.

Figure 2:
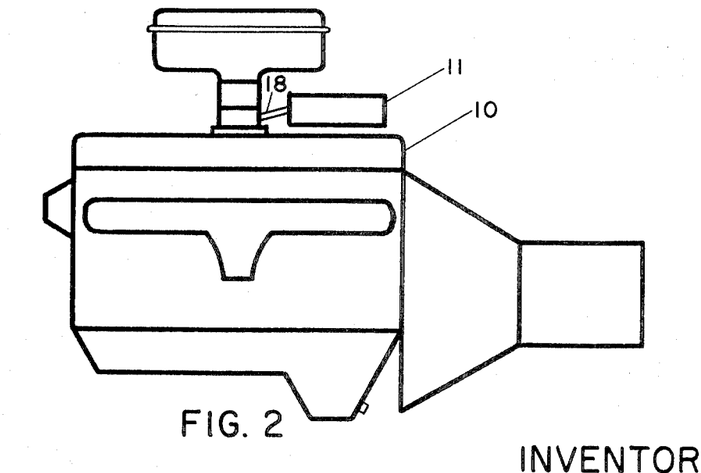
FIGS. 2–5 show various methods of heating the catalytic reactor.

The component parts of FIG. 2 are essentially the same as in FIG. 1 except that the heating element 22 is positioned in the catalyst bed. This heating element is an electrical resistance wire which heats the catalyst to the desired temperature for conversion or regeneration.

Figure 3:
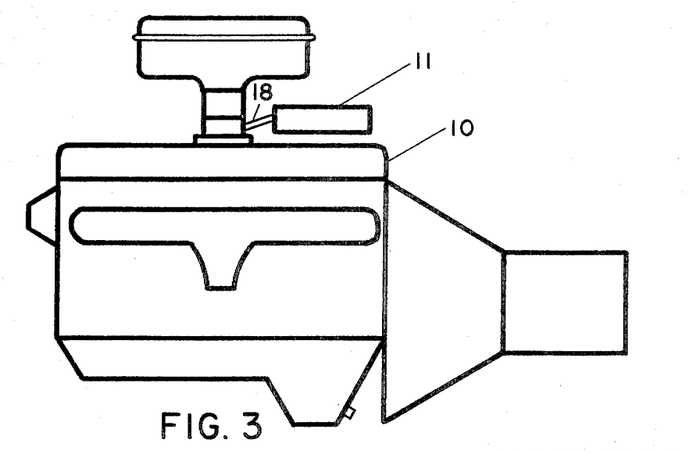

FIG. 3 shows another modification. In this system, an ignition element 22 serves to ignite a portion of the fuel to provide heat to the catalyst bed.

Figure 4:
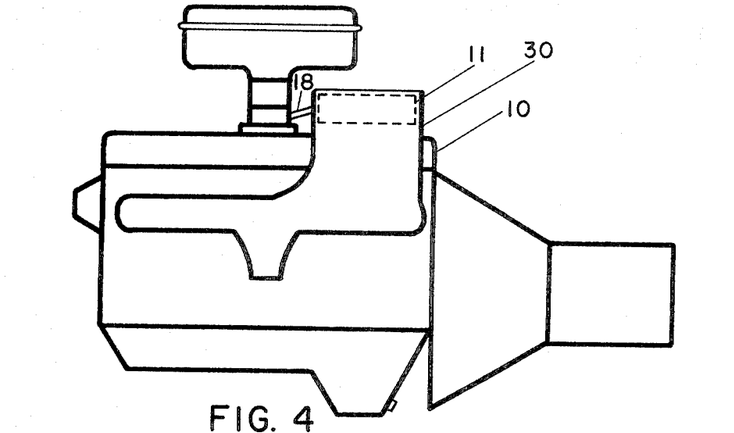

FIG. 4 shows a method of heating the catalytic converter by adding an extension to the exhaust manifold 30 which completely surrounds the converter and adds the necessary heat to effect the desired reactions.

Figure 5:
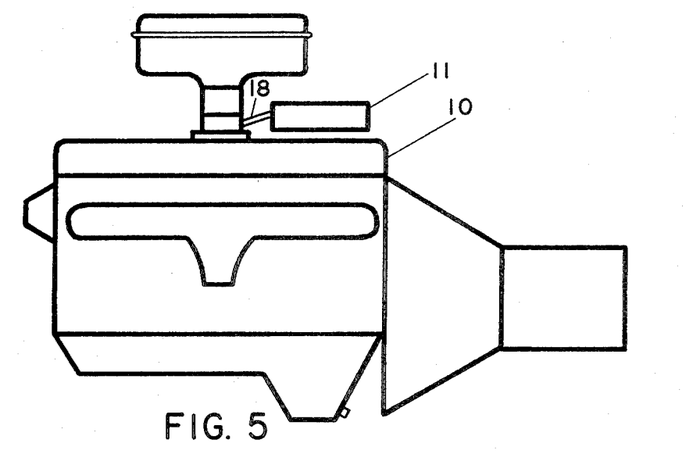

FIG. 5 shows the addition of pellets 24 to the system. These pellets are oxidation catalysts that are added to the conversion catalyst to supply the desired heat by promoting partial oxidation of the fuel to bring the catalytic converter to the temperature at which the reaction takes place.

Figure 6:
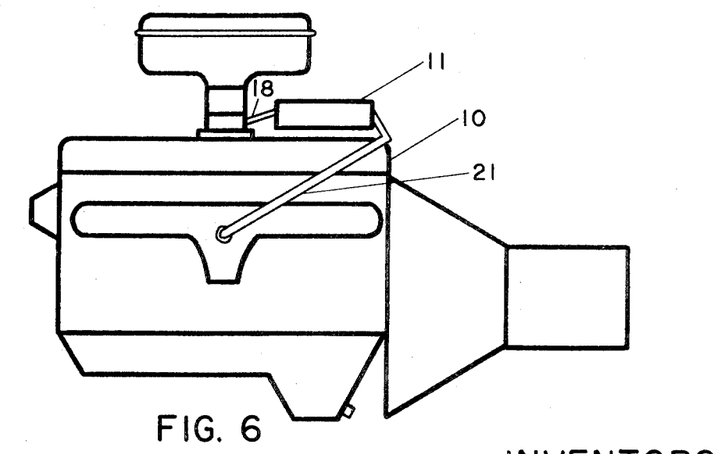
FIG. 6 shows a method of heating the reactor by bleeding gases from the exhaust manifold through the bed.

FIG. 6 shows a system in which a portion of the hot gases from the exhaust manifold are taken from the line 21 to the intake control orifices 14 and 15. In this system, the effluent from line 21 is used to heat both the sections of the catalyst bed.

Figure 7:
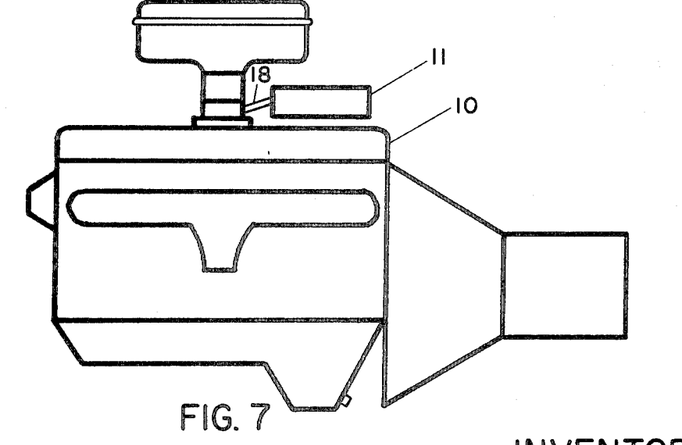
FIG. 7 shows a typical reactor system wherein all of the catalyst is contained in a single bed.

FIG. 7 shows another modification of the system in which all of the catalyst is contained in a single bed. In this modification, the valve 12 directs the gasoline to the catalytic conversion section 19. During the period when the gasoline is being passed through the catalytic conversion section 19, air is being passed through the catalyst through the orifice 14. The effluent from the converter is passed through the valve 16 and the line 18 directly into the carburetor.

The preferred fuel for use in our novel system is a commercially available gasoline. Our novel system converts the gasoline to low-boiling hydrocarbons and thus minimizes the importance of octane value of the gasoline being used. The fuel commercially available as regular gasoline will give satisfactory results even though the octane level of these fuels is lower than the octane of the higher priced fuels.

The fuel may be used with or without additives to control coking, to increase performance, or to increase fuel economy. Out novel process converts a sufficient quantity of hydrocarbons to low-boiling hydrocarbons so that kerosene, diesel fuels, and other fuel components made up of long chain hydrocarbons can be used as the fuel.

The catalytic converter used in our novel system is compact and can be easily accommodated near the Otto combustion engine. The preferred embodiment of our reactor is shown in the drawings. The catalytic converter is the essential feature of our novel system.

Broadly speaking, the converter is a container having means to suspend the catalyst therein and means to bring the catalyst to the temperature necessary to crack the liquid hydrocarbon fuel to lower molecular weight hydrocarbons. The reactor can operate without the addition of a gaseous agent to control coke formation, although the addition of water, steam, or air to the system would increase the life of the catalyst.

The system can operate without a means to regenerate the catalyst, although, the use of such a regeneration means, is obviously preferred.

Use of an electrically heated catalyst bed or a small electrically heated catalyst zone can initiate the catalytic reaction before the engine is started.

Our novel system adds only one additional feature to a conventional internal combustion engine. The additional feature is the catalytic cracking reactor which is positioned near the carburetor. The gasoline from the tank is pumped into this reactor using a conventional fuel pump.

Our system increases the octane value of the fuel and decreases the engine wear caused by the presence of carbonaceous materials in the cylinders of the engine. The effluent from the reactor in our novel process contains a significant amount of low-boiling hydrocarbons.

The only requirement for the catalyst of our invention is that it be capable of cracking hydrocarbons having six to 15 carbon atoms in the molecule to lower molecular weight hydrocarbons with minimal coke formation and be capable of regeneration with steam or air. The catalyst can be a relatively cheap material such as catalysts made from silicates, clay, etc.

The catalysts that can be used for our reactor include conventional cracking catalysts. The zeolite containing catalysts that are currently available would give exceptionally good results. However, the conventional silica-alumina cracking catalyst containing from about 14–30 percent alumina can also be used. A conventional cracking catalyst containing from about 5–85 percent of a stabilized zeolite having a silica to alumina ratio of about 5 to 8 gives satisfactory results.

Since our reactor is very compact and overcracking is not a problem, the catalyst used could also be a zeolite that is stable to thermal conditions as high as 1,700° F. Catalysts known to crack hydrocarbons to very low molecular weight gases such as methane and hydrogen are applicable. Included in this group are the well-known dehydrogenation catalysts.

Our system works satisfactorily with any internal combustion engine. Otto, diesel, or diesel electric engines can be used. The engine can be either stationary or an engine installed in a vehicle such as an automobile, bus, truck etc.

Our system works satisfactorily with or without emission control devices such as catalytic mufflers.

Another feature of our novel process is the conversion of the residues on the catalyst by oxidation of these residues as the system operates.

In addition, our novel process is equipped with means to heat the catalyst bed to the desired temperature of about 1,000° to 1,500° F. This is accomplished by use of heaters, heat from the exhaust system, passing a portion of the exhaust gases through the bed, or a combination of these.

Our invention is further illustrated by the following specific but nonlimiting examples.

EXAMPLE 1

This example demonstrates that a reasonably large amount of liquid fuel can be cracked to lower molecular weight molecules without regeneration.

A total of 25 grams of a synthetic gasoline were prepared by mixing 50 percent n-heptane, 25 percent toluene and 25 percent n-octane. The mixture was passed over 5 grams of a zeolite-containing catalyst heated to about 900° F. The cracked product was collected in 5 ml. portions in a cold trap, cooled by liquid nitrogen. The analysis of the collected samples was determined by slowly warming the sample and allowing it to vaporize. A major portion of the product had a boiling point below room temperature indicating that:

1. A large amount of cracking was still occurring at the end of the experiment, and
2. The cracking product contained large amounts of volatile molecules.

A very small amount, on the order of only 2 percent of the original gasoline, was converted to coke in the process.

EXAMPLE 2

This example illustrates the operation of a 2½ horsepower, 1-cylinder Otto engine on heptane fuel using the catalytic cracking device to crack the fuel immediately before admission into the intake manifold of the engine. Conditions for operation of the engine and device were:

The device was maintained by use of an electrical heater at a temperature of 1,100° F. in the catalyst bed during the cracking operation. The fueled rate through the catalyst bed was about 11 cubic centimeters per minute of heptane. The fuel used was normal heptane. The catalyst used was a rare earth exchanged Type Y zeolite. The quantity of catalyst used in a catalyst chamber was approximately 6 grams. The form of the catalyst was ⅛-inch pellets. The catalyst device consisted of four chambers of about 10 cubic centimeters volume each. Two of the chambers were filled with catalysts. Two of the chambers were left empty. The device was operated on only one chamber at any time. Air was fed through the chambers at approximately 500 cubic centimeters per minute continuously during the operation of the device. The engine was connected by belt to an electric generator. The electrical generator was connected to a heater for dissipation of energy.

EXAMPLE 3

The engine described above was observed to operate nicely under conditions of no load on heptane and on cracked heptane. The application of a small load of about 5 watts of power to the engine produced severe knocking when the engine was operated on uncracked heptane. Operation of the engine on uncracked heptane was done by simply feeding the fuel through an empty catalyst chamber. Operation of the engine on cracked heptane, that is heptane which was passed through a catalyst-containing chamber under the standard operating conditions showed that the engine operated well with no knocking observed upon application of a load in excess of 300 watts.

EXAMPLE 4

The maximum power output obtainable from the operation of the engine on cracked and uncracked heptane was determined using the device and engine described in the previous examples. To test the maximum power output of the engine, the throttle on the carburetor was opened fully and the fuel flow through the device was adjusted to give the maximum sustainable power output. The first test was carried out with operation of engine on uncracked heptane. The heptane was passed through an empty catalyst chamber. It was observed that the maximum power output obtainable was 30–60 watts with a fuel flow of 12–13 cubic centimeters of liquid heptane per minute. The next test was done using cracked heptane— heptane passed through a catalyst-filled chamber heated to 1,100° F.—to operate the engine. It was found that 300–500 watts of power was obtainable at a fuel flow of 10–11 cubic centimeters of liquid heptane per minute. It was observed that the maximum power output was sustainable for extended periods of time.

What is claimed is:

1. A method of reducing engine wear and improving the performance of an internal combustion engine which comprises contacting a liquid hydrocarbon fuel in the absence of air with a catalyst in a catalytic converter under hydrocarbon-cracking conditions and mixing the lower boiling hydrocarbons formed with air and passing said hydrocarbons into the fuel inlet of said internal combustion engine.

2. The process according to claim 1 wherein said hydrocarbon fuel is a hydrocarbon fraction boiling in the 100° to 700° F. range.

3. The process according to claim 1 wherein said fuel is an unleaded gasoline.

4. A method of improving the performance of an internal combustion engine which comprises:
   a. selecting a hydrocarbon fuel boiling in the range of 100–700°F.,
   b. contacting said fuel with a catalyst in the absence of air in a catalytic converter heated to about 500 to 1,500° F. to convert a substantial portion of said fuel to gaseous hydrocarbons having about one to five carbon atoms in the molecule, and
   c. mixing said hydrocarbons with air and passing said mixture into the fuel intake system of said internal combustion engine.

5. The process according to claim 4 wherein the catalyst is a hydrocarbon-cracking catalyst selected from the group consisting of clay, alumina, silica-alumina containing about 15 to 30 percent alumina, and zeolite promoted silica-alumina.

6. The process according to claim 5 wherein the catalyst is a zeolitic catalyst containing about 5 to 15 percent zeolite dispersed within and throughout a silica-alumina base.

7. The process according to claim 4 wherein the catalyst is a faujasite type zeolite having a silica-to-alumina ratio of about 3 to 8.

8. The process according to claim 4 wherein the fuel is lead free.

9. The process according to claim 4 wherein the fuel is fed to said internal combustion engine through a carburetor.

* * * * *